United States Patent
Sudo et al.

(10) Patent No.: US 9,052,534 B2
(45) Date of Patent: Jun. 9, 2015

(54) OPTICAL ANALOG-TO-DIGITAL CONVERTER, METHOD OF CONSTRUCTING THE SAME, OPTICAL SIGNAL DEMODULATOR, AND OPTICAL MODULATOR-DEMODULATOR

(75) Inventors: Shinya Sudo, Tokyo (JP); Kenji Sato, Tokyo (JP)

(73) Assignee: NEC CORPORATION, Tokyo (JP)

( * ) Notice: Subject to any disclaimer, the term of this patent is extended or adjusted under 35 U.S.C. 154(b) by 259 days.

(21) Appl. No.: 13/698,018

(22) PCT Filed: Apr. 28, 2011

(86) PCT No.: PCT/JP2011/002511
§ 371 (c)(1),
(2), (4) Date: Nov. 14, 2012

(87) PCT Pub. No.: WO2011/145281
PCT Pub. Date: Nov. 24, 2011

(65) Prior Publication Data
US 2013/0063806 A1    Mar. 14, 2013

(30) Foreign Application Priority Data

May 19, 2010    (JP) ................... 2010-115544

(51) Int. Cl.
*G02F 2/00* (2006.01)
*H03M 1/00* (2006.01)
*G02F 7/00* (2006.01)

(52) U.S. Cl.
CPC ............. *G02F 7/00* (2013.01); *Y10T 29/49826* (2015.01); *G02F 2/00* (2013.01); *G02F 2002/006* (2013.01); *G02F 2203/50* (2013.01)

(58) Field of Classification Search
None
See application file for complete search history.

(56) References Cited

U.S. PATENT DOCUMENTS 4,947,170 A * 8/1990 Falk .............................. 341/137
5,933,554 A    8/1999 Leuthold et al.
(Continued)

FOREIGN PATENT DOCUMENTS

JP    61-203566 U    12/1986
JP    64-56426 A    3/1989
(Continued)

OTHER PUBLICATIONS

United States Office Action dated Mar. 11, 2014 in U.S. Appl. No. 13/698,019.
(Continued)

*Primary Examiner* — Hemang Sanghavi
(74) *Attorney, Agent, or Firm* — McGinn IP Law Group, PLLC

(57) ABSTRACT

An optical A/D converter according to the present invention includes an optical splitter that splits an analog input signal light into plurals, a plurality of Mach-Zehnder interferometers to which each of the signal lights split by the optical splitter is input, and plurality of optical/electrical conversion unit that convert each signal lights output from each Mach-Zehnder interferometer into a digital electrical signal, in which each Mach-Zehnder interferometer includes optical intensity-to-phase conversion unit that optically convert intensity of the input signal light into an amount of phase shift and the amount of phase shift differs for each Mach-Zehnder interferometer. Then, it is possible to provide a high speed and low power consuming optical demodulation circuit.

17 Claims, 19 Drawing Sheets

(56) References Cited

U.S. PATENT DOCUMENTS

| | | | |
|---|---|---|---|
| 6,118,397 A * | 9/2000 | Heflinger | 341/137 |
| 6,292,119 B1 | 9/2001 | Carillo, Jr. et al. | |
| 6,760,524 B2 | 7/2004 | Mukai | |
| 7,423,564 B2 | 9/2008 | Kitayama et al. | |
| 7,564,387 B1 * | 7/2009 | Vawter et al. | 341/137 |
| 7,570,184 B2 | 8/2009 | Ikeda et al. | |
| 7,801,451 B2 | 9/2010 | Tsuchida et al. | |
| 8,265,489 B2 | 9/2012 | Kikuchi | |

FOREIGN PATENT DOCUMENTS

| | | |
|---|---|---|
| JP | 11-502634 A | 3/1999 |
| JP | 2001-51314 | 2/2001 |
| JP | 2001-264709 A | 9/2001 |
| JP | 2003-295246 A | 10/2003 |
| JP | 2004-61889 A | 2/2004 |
| JP | 2005-173530 A | 6/2005 |
| JP | 2006-276095 A | 10/2006 |
| JP | 2007-24924 A | 2/2007 |
| JP | 2008-52066 A | 3/2008 |
| JP | 2008-209775 A | 9/2008 |
| JP | 2010-26458 A | 2/2010 |
| WO | WO 2009/060920 A1 | 5/2009 |

OTHER PUBLICATIONS

International Search Report (ISR) (PCT Form PCT/ISA/210) dated Jun. 14, 2011, in PCT/JP2011/002511.
United States Notice of Allowance dated Jun. 24, 2014, in U.S. Appl. No. 13/698,019.

* cited by examiner

OPTICAL ANALOG-TO-DIGITAL CONVERTER, METHOD OF CONSTRUCTING THE SAME, OPTICAL SIGNAL DEMODULATOR, AND OPTICAL MODULATOR-DEMODULATOR

TECHNICAL FIELD

The present invention relates to an optical analog-to-digital converter, an optical signal demodulator and an optical modulator-demodulator using thereof, and a method of constructing the optical analog-to-digital converter that are used in an optical communication system and optical interconnection.

BACKGROUND ART

Improvement in the speed and increase in the capacity by wavelength division multiplexing is further progressing in the optical communication system in intermediate and long distances. The current main optical communication system uses wavelength division multiplex communication with determined wavelength channel spacing. Therefore, with 50 GHz spacing in the band of an optical fiber amplifier, approximately 100 channels can be used.

When the channel spacing is $\Delta f$[Hz] and the transmission rate is B[bit/s], B/$\Delta f$[bit/s/Hz] shall be spectral efficiency. When $\Delta f$=50 GHz and the transmission rate is 100 Gbit/s for each channel, the spectral efficiency will be 2 bit/s/Hz.

As the band of the optical fiber amplifier is limited, it is necessary to improve the spectral efficiency. However, simply increasing the bit rate of a signal in order to improve the spectral efficiency raises a problem of interchannel crosstalk. Thus, study on optical multi-level modulation and optical OFDM (Orthogonal Frequency-Division Multiplexing) has been progressing as a next generation optical communication system. The optical multi-level modulation is a method to increase the amount of information by multi-leveling using an amplitude and a phase of a light without increasing the spectral band unlike optical intensity modulation of a related art using two values of 0 and 1. Moreover, in the optical OFDM, an OFDM signal is generated by an electrical signal and is optically modulated, and optical subcarriers are set in an orthogonal state to multiplex. This solves the crosstalk problem, thereby improves the spectral efficiency.

An optical signal with multi-leveling and multiplexing mainly involving electrical signal processing in this way is transmitted and demodulated into an electrical signal by a receiver. An analog-to-digital (A/D) converter is required in the subsequent stage of a PD (photodiode) of an optical demodulation circuit. Currently, an A/D converter using an electrical circuit is commonly used.

On the other hand, there are many proposals for the optical A/D converter that directly derives analog quantity of an optical signal as a digital value because of the feature of rapidity included therein. For example, Patent Literature 1 splits an optical signal by different predetermined split ratios to represent the amount of a light by a predetermined ratio and detects an optical analog quantity of the input optical signal by evaluating whether each split optical signal reaches a threshold.

Further, Patent literature 2 composes in optical A/D conversion means a feedback system through a nonlinear optical element for an input optical signal, which is an analog signal, and thus a first output light, which is a digital signal, is sequentially obtained from the optical A/D conversion means.

In Patent Literature 3, an optical coding circuit optically codes pulse trains of a signal light having a first wavelength according to control light, which is pulse trains of a light analog signal having a nearby second wavelength different from the first wavelength and is optically sampled, by a plurality of optical coders provided with optical nonlinear elements having periodic characteristics whose input and output characteristics regarding optical intensity are different, and outputs the pulse trains of the plurality of optically coded signal lights from each optical coder. Then, an optical quantization circuit outputs pulse trains of a carrier light having a nearby third wavelength that is different from the first wavelength as an optical digital signal after conducting optical threshold processing according to the pulse trains of the plurality of optically coded signal lights and optical quantization using a plurality of optical threshold processing devices provided with optical nonlinear elements which are respectively connected to each optical coder and have periodic input and output characteristics regarding the optical intensity.

Patent Literature 4 is characterized in that a plurality of interference optical modulators are included, a photovoltaic element is formed on the same substrate, and an output voltage of this photovoltaic element is applied on the interference optical modulators. Therefore, in this example, a PD receives an intensity signal light once and converts the intensity signal light into a voltage signal, thereby determining the speed of the entire circuit by the speed of this electrical signal.

Patent Literature 5 discloses a technique to sample a signal light using probe light and perform A/D conversion. Moreover, Patent Literature 6 discloses a technique to successively perform A/D conversion by light subtraction.

CITATION LIST

Patent Literature

Patent Literature 1: Japanese Unexamined Patent Application Publication No. 2007-24924
Patent Literature 2: Japanese Unexamined Patent Application Publication No. 1-56426
Patent Literature 3: Japanese Unexamined Patent Application Publication No. 2005-173530
Patent Literature 4: Japanese Utility Model No. 61-203566
Patent Literature 5: Japanese Unexamined Patent Application Publication No. 2008-209775
Patent Literature 6: Japanese Unexamined Patent Application Publication No. 2001-051314

SUMMARY OF INVENTION

Technical Problem

When the A/D converter disposed in the subsequent stage of the PD in an optical demodulation circuit on the receiver side uses an electrical circuit, multi-leveled and multiplexed transmissions mainly involving electrical signal processing with an increased optical transmission capacity is limited to the speed of the electrical signal processing. For example, in a reported instance of an electrical OFDM, the bit rate of each subcarrier remains below Gbit/s. Additionally, there has been a problem that the power consumption for processing is large.

On the other hand, the method of using the optical A/D converter is considered to have a complicated configuration due to the difficulty of subtracting a light with given intensity from a light with some intensity.

The present invention is made in view of the above circumstances and its object is to provide an optical demodulation circuit using a high speed and low power consuming optical A/D converter.

Solution to Problem

An optical A/D converter according to the present invention includes:

an optical splitter that splits an input analog optical signal into plurals, a plurality of Mach-Zehnder interferometers to which each of the optical signals split by the optical splitter is input, plurality of optical/electrical conversion unit that convert each optical signal output from each Mach-Zehnder interferometer into a digital electrical signal, in which each Mach-Zehnder interferometer comprises optical intensity-to-phase conversion unit that optically converts intensity of the input optical signal into an amount of phase shift, and the amount of phase shift differs for each Mach-Zehnder interferometer.

A method of constructing an optical A/D converter according to the present invention comprises:

providing an optical splitter that splits an input analog optical signal into plurals, providing a plurality of Mach-Zehnder interferometers, each of the optical signals split by the optical splitter being input to the plurality of Mach-Zehnder interferometers, providing plurality of optical/electrical conversion unit that convert each optical signal output from each Mach-Zehnder interferometer into a digital electrical signal, providing optical intensity-to-phase conversion unit to each Mach-Zehnder interferometer, in which the optical intensity-to-phase conversion unit optically converts intensity of the input optical signal into an amount of phase shift, and performing construction so that the amount of phase shift will be different for each Mach-Zehnder interferometer.

Advantageous Effects of Invention

According to the present invention, it is possible to obtain a high-speed and low power consuming optical A/D converter and realizes an optical signal demodulator and an optical modulator-demodulator with the optical A/D converter included therein at a high speed with low power.

DESCRIPTION OF EMBODIMENTS

It is necessary to detect the state of a phase and an amplitude of a light in order to demodulate a multi-leveled and multiplexed optical signal. However, as it is difficult to detect the state of a light on a complex plane, generally a preceding stage separates the optical signal into a real part I and an imaginary part Q and a receiver (PD) detects intensity information of the respective real part I and imaginary part Q.

For example, the technique of coherent optical detection uses a device called an optical phase hybrid that makes four beams of local lights having phases different by 90 degrees respectively interfere with a signal light, obtains two beams each of output lights for the real part I and the imaginary part Q, and a PD (Photodiode) receives the two beams each of lights. The present invention performs optical A/D conversion using intensity information in the two each of the lights after the optical signal is already separated into the real part I or the imaginary part Q.

Detection of optical intensity has previously been carried out by a PD receiving and converting a light into an electrical signal, and the electrical signal is converted into a digital value by an A/D converter by an electrical circuit. The method of using the optical A/D converter for this is considered to have a complicated configuration due to the difficulty of subtracting a light with given intensity from a light with some intensity. Therefore, the present invention further includes a circuit for converting the intensity into delay and performs processes by an optical phase. Then, in the following exemplary embodiments of the present invention, optical intensity is divided into multiple bits from the light as is to obtain a digital value.

Hereinafter, specific exemplary embodiments incorporating the present invention are explained in detail with reference to the drawings. However, the present invention is not necessarily limited to the following exemplary embodiments. Moreover, the following description and drawings are simplified as appropriate for clarity of the explanation.

First Exemplary Embodiment

Figure 1:
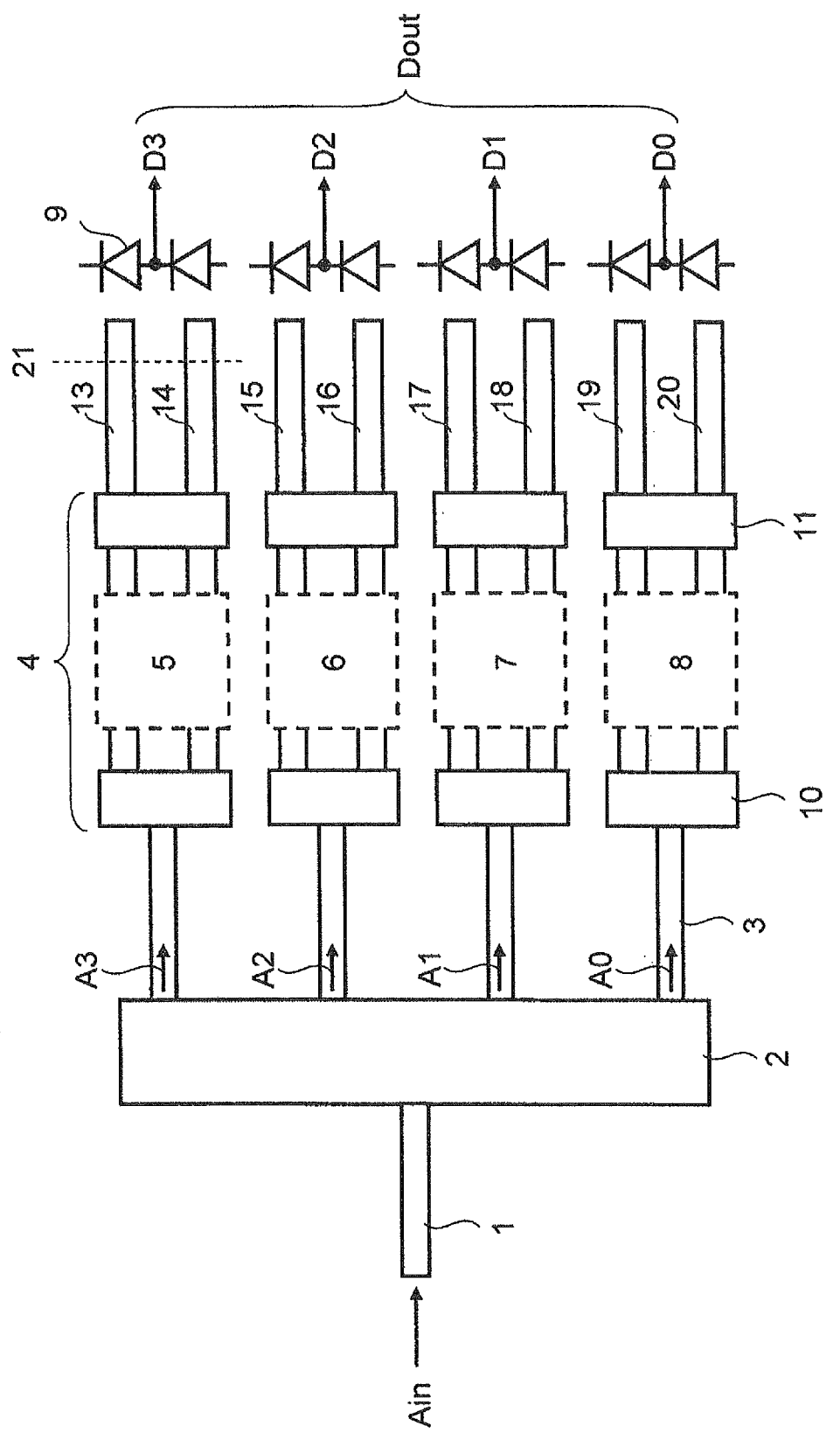
FIG. 1 is a block diagram of an optical A/D converter according to a first exemplary embodiment.
Figure 2A:
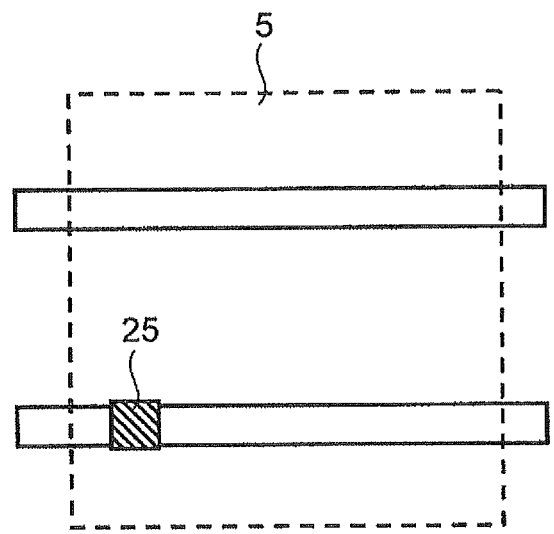
FIG. 2A is a diagram showing a configuration of an optical modulation region 5 in FIG. 1.
Figure 2B:
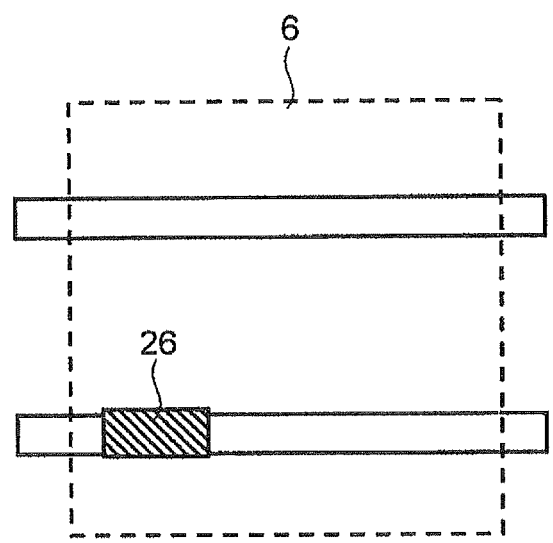
FIG. 2B is a diagram showing a configuration of an optical modulation region 6 in FIG. 1.
Figure 2C:
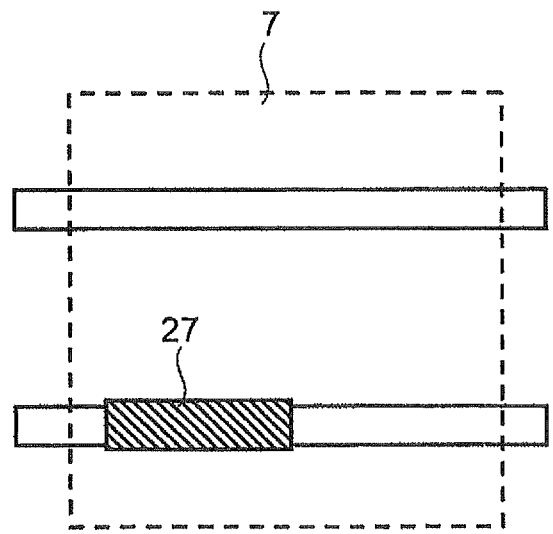
FIG. 2C is a diagram showing a configuration of an optical modulation region 7 in FIG. 1.
Figure 2D:
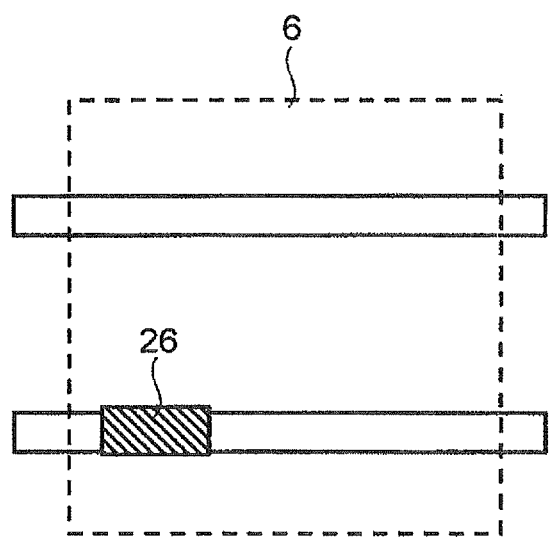
FIG. 2D is a diagram showing a configuration of an optical modulation region 8 in FIG. 1.

FIG. 1 is a block diagram of an optical A/D converter according to a first exemplary embodiment. FIG. 1 shows a configuration example of a four-bit optical A/D converter. This optical A/D converter includes an input port 1, an optical splitter 2, optical waveguides 3, Mach-Zehnder (MZ) interferometers 4, output ports 13 to 20, and balanced receivers 9.

The analog input signal Ain, which is an optical signal, is input from the input port 1 and is split by the optical splitter 2 into four equivalent analog signals A3, A2, A1, and A0. This number of split corresponds to the number of bits of the optical A/D converter. Each of the lights split by the optical splitter 2 is input to the MZ interferometer 4 through the optical waveguide 3.

As shown in FIG. 1, the MZ interferometers 4 include four paths that each has one optical splitter 10 and optical coupler/splitter 11. Further, the optical modulation regions 5, 6, 7, and 8 are provided between the optical splitter 10 and the optical coupler/splitter 11 in the respective paths. The four pairs of analog signals A3, A2, A1, and A0 that are split into two arms by the optical splitter 10 are respectively input to the optical modulation regions 5, 6, 7 and 8.

The optical modulation regions 5, 6, 7, and 8 each have two upper and lower inputs and two upper and lower outputs, in which the upper input port is connected to the upper output port and the lower input port is connected to the lower output port. In these regions, the phase of the light passing through the lower input and output ports changes according to the intensity of the optical signal input from the input port 1 as compared to the light passing through the upper input and output ports. Each of the optical modulation regions 5, 6, 7, and 8 is designed to include the amount of phase shift (phase rotation) necessary for outputting a signal corresponding to each bit of the digital signal. Note that the details are described later.

Next, the top path in FIG. 1 is explained as an example, a pair of lights output from the upper and lower output ports through the optical modulation region 5 interferes in the optical coupler/splitter 11. Then, the output light is distributed to the pair of output ports 13 and 14. Similarly, a pair of lights output from the upper and lower output ports through the optical modulation region 6 interferes in the optical coupler/splitter 11, and then distributed to the pair of output ports 15 and 16. A pair of lights output from the upper and lower output ports through the optical modulation region 7 interferes in the optical coupler/splitter 11, and then distributed to the pair of output ports 17 and 18. A pair of light output from the upper and lower output ports through the optical modulation region 8 interferes in the optical coupler/splitter 11, and then distributed to the pair of output ports 19 and 20. Note that although FIG. 1 illustrates that the optical splitter 10 has one input and two outputs, and the optical coupler/splitter 11 has two inputs and two outputs, it is not limited to this.

Next, a pair of lights output from each path of the MZ interferometer is O/E (optical/electrical) converted by the balanced receiver 9. The balanced receiver 9 here is composed of a pair of PDs that are connected in series. Assigning 0 and 1 of a digital signal according to an output from each balanced receiver 9 generates a digital output signal Dout.

Figure 3:
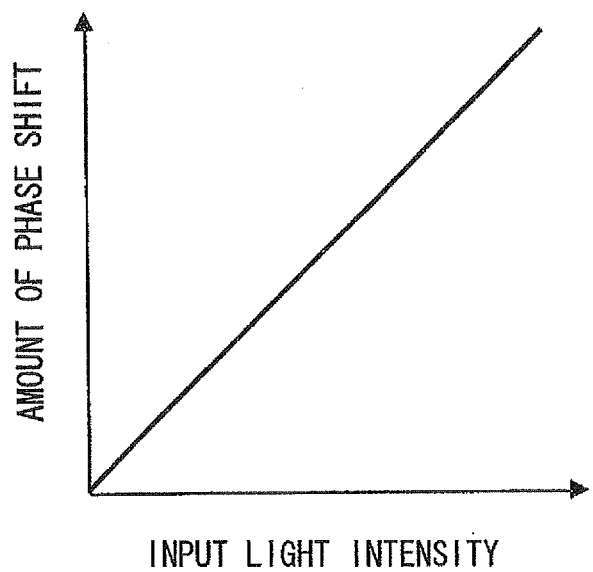
FIG. 3 is a graph showing features included in optical intensity-to-phase conversion units 25 to 28.

Next, an operating principle is explained using FIGS. 2A to 2D. FIG. 2A to 2D are diagrams respectively showing details of the optical modulation regions 5 to 8 in FIG. 1. One arms (upper arms in FIGS. 2A to 2D) in the optical modulation regions 5 to 8 are normal optical waveguides. Light intensity phase conversion units 25, 26, 27, and 28 are respectively provided to the other arms (lower arms in FIGS. 2A to 2D). All of the optical intensity-to-phase conversion units 25, 26, 27, and 28 have linear characteristics as shown in FIG. 3, in which the input optical intensity and the amount of phase shift are in a proportional relationship.

Specifically, the "Kerr effect", the "self phase modulation effect of a Semiconductor Optical Amplifier (SOA)", and the like can also be used. When the nonlinear effect is used, the current value of SOA and further, the intensity of the signal light itself should be adjusted in advance to be appropriate to use a linear region as much as possible.

For the sake of simplicity, the optical intensity-to-phase conversion units 25, 26, 27, and 28 shall have the same characteristics per unit length. Additionally, the length of the optical intensity-to-phase conversion unit 25 is determined so that the phase rotation of the optical intensity-to-phase conversion unit 25 will be $2\pi$ at certain specified maximum and minimum optical intensity. The length thereof shall be L.

Figure 4:
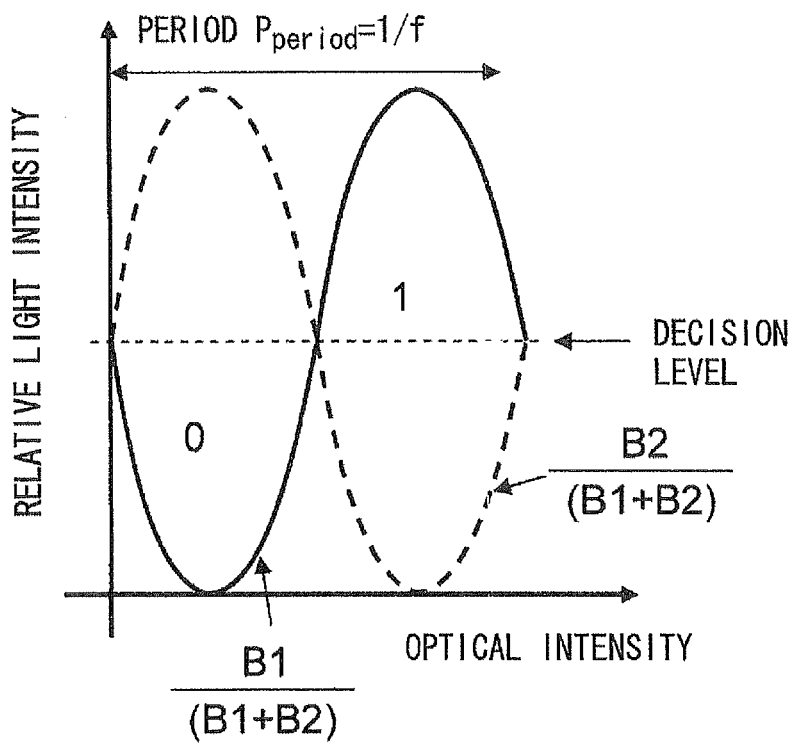
FIG. 4 is a graph showing relative optical intensity on a cross-section 21 in FIG. 1.

Then, the light transmitting through the MZ interferometer 4 changes in a manner such that delay between the arms of the light modulation region 5 changes from 0 to $2\pi$ according to the optical intensity from the minimum optical intensity to the maximum optical intensity. Accordingly, the ratio of output optical intensity B1 from the output port 13 to a total (B1+B2) of the output optical intensity B1 from the output port 13 and output optical intensity B2 from the output port 14 passed through the MZ interferometer 4, which is relative optical intensity B1/(B1+B2), changes as shown in FIG. 4. The horizontal axis in FIG. 4 indicates the input optical intensity and vertical axis indicates the relative optical intensity. FIG. 4 here shows the relative optical intensity on a cross-section 21 in FIG. 1.

Figure 5:
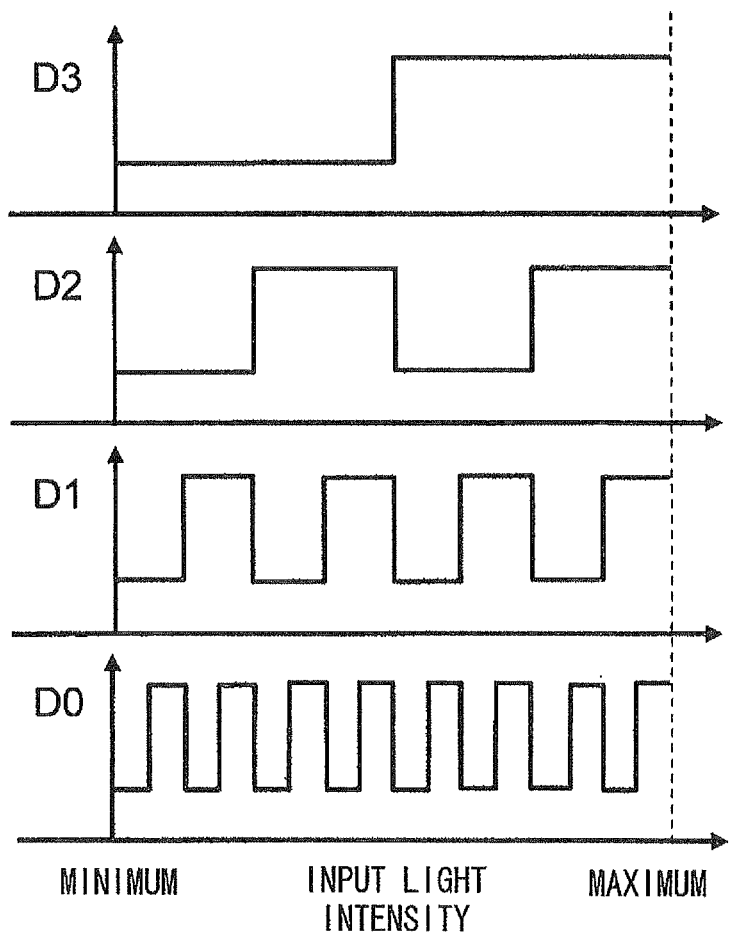
FIG. 5 is a diagram showing digital signals depending on input optical intensity output from an optical A/D converter according to first, second, and third exemplary embodiments.

Next, the intensity of the output optical intensity B1 and B2 is compared and an evaluation of 0 or 1 should be performed according to which one is greater. Specifically, as the balanced receiver 9 can detect the difference in the output by combining the two PDs, a digital value can be obtained using a comparator. In this way, the digital value like the digital signal D3 in FIG. 5 is obtained according to the input optical intensity.

This ratio is set so that the phase rotation will be $2\pi$ according to the optical intensity from the minimum optical intensity to the maximum optical intensity in the optical modulation region 5. Therefore, the repetition period $P_{period}=1/f$ (f is a repetition frequency) will be one period according to the optical intensity from the minimum optical intensity to the maximum optical intensity.

Next, the optical intensity-to-phase conversion units 26, 27, and 28 can be respectively configured to 2L, 4L, and 8L based on the length L of 25, and then the phase rotation of the optical modulation regions 6, 7, and 8 will be $4\pi$, $8\pi$, and $16\pi$ according to the optical intensity up to the maximum optical intensity. Accordingly, when the repetition frequency in the above optical modulation region 5 is f, the repetition frequency of the ratio of the output optical intensity from the output port 15 to the total output optical intensity from the output ports 15 and 16 will be 2×f. Similarly, the repetition frequency of the ratio of the output optical intensity from the output port 17 to the total output optical intensity from the output port 17 and output port 18 will be 4×f. The repetition frequency of the ratio of the output optical intensity from the output port 19 to the total output optical intensity from the output port 19 and output port 20 will be 8×f.

In general, to create an n-bit optical A/D converter, the lengths of the optical intensity-to-phase conversion units are set to be longer at less significant bits. Specifically, when the length at the most significant bit is L, the length at each less significant bit shall be $2^k$ (k=0, . . . , n−1) times of the length L in order.

Each of outputs from the optical modulation regions 5 to 8 is input to the balanced receivers 9, and digital signals D3, D2, D1, and D0 corresponding to the analog signals A3, A2, A1 and A0 are output. Specifically, the digital signals D3, D2, D1, and D0 as shown in FIG. 5 can be obtained according to the input optical intensity. In other words, the optical intensity of the analog input signal is converted into the digital signal. Note that when the average optical intensity input from the input port 1 is small, the light should be amplified in advance so that the average optical intensity will be close to just the middle value of the digital signal. Moreover, it is desirable to adjust the operating state of the optical intensity-to-phase conversion units 25, 26, 27, and 28 in advance so that the optical intensity is close to the maximum value of the digital signal at the maximum optical intensity and close to the minimum value of the digital signal at the minimum optical intensity.

Second Exemplary Embodiment

Figure 6:
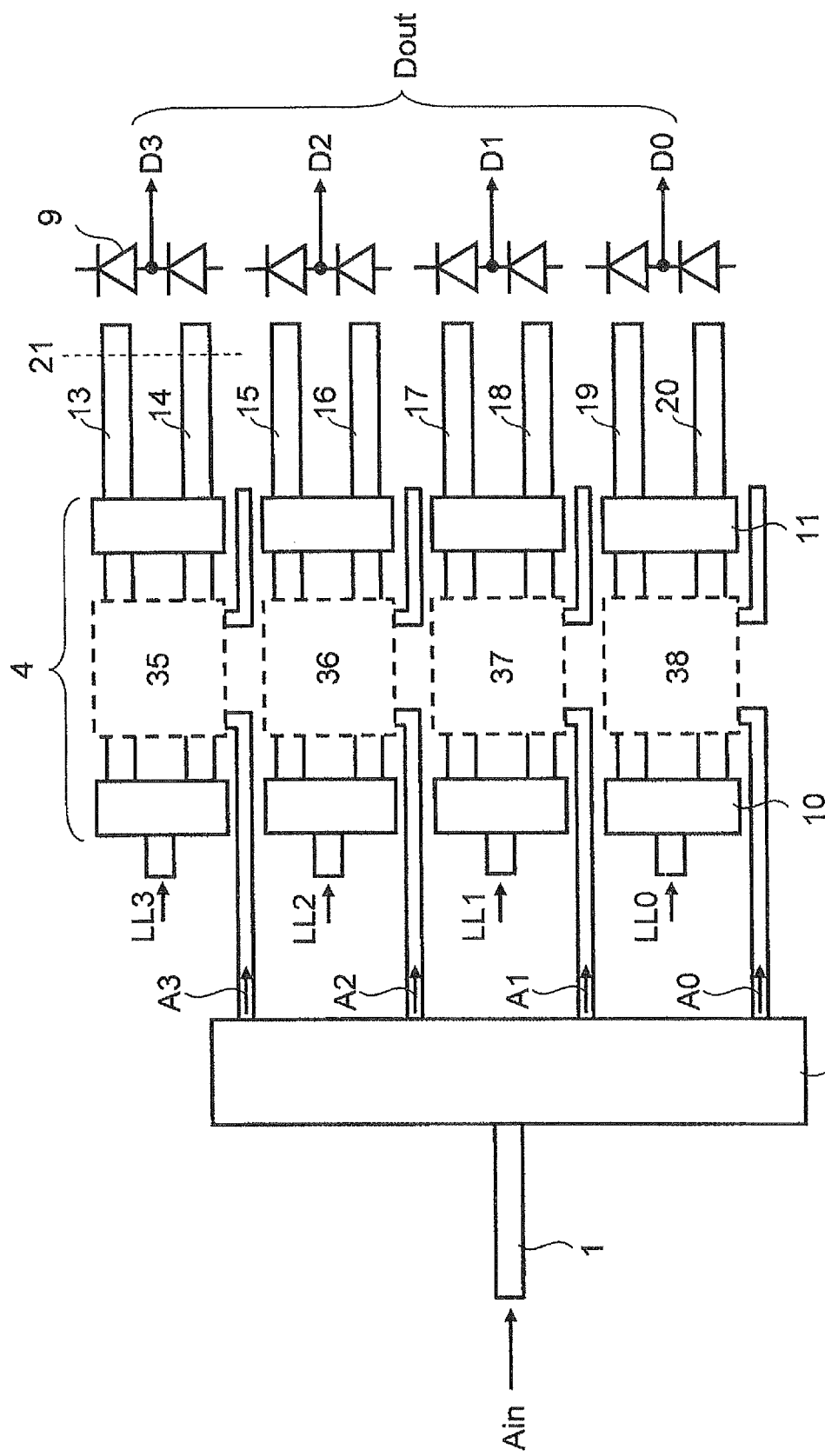
FIG. 6 is a block diagram of the optical A/D converter according to the second exemplary embodiment.

Next, a second exemplary embodiment is explained with reference to FIG. 6. FIG. 6 is a configuration example of a four-bit optical A/D converter. The same components as those in FIG. 1 are denoted by the same reference numerals, and the explanation is omitted as appropriate. A local light is not introduced in the optical modulation regions 5, 6, 7, and 8 in FIG. 1 in the first exemplary embodiment. On the other hand, this exemplary embodiment is different in the point that a local light LL3, LL2, LL1, and LL0 is introduced in optical modulation regions 35, 36, 37, and 38.

An analog input signal Ain is input from the input port 1 and split into four equivalent analog signals A3, A2, A1, and A0 by the optical splitter 2. This number of split corresponds to the number of bits of the optical A/D converter. Each light split by the optical splitter 2 is input to the respective optical modulation regions 35, 36, 37, and 38 inside the MZ interferometer 4. Moreover, the local light LL3, LL2, LL1, and LL0 split by the optical splitter 10 into two arms is input respectively to the optical modulation regions 35, 36, 37, and 38.

The optical modulation regions 35, 36, 37, and 38 here each have two upper and lower inputs and two upper and lower outputs, in which the upper input port is connected to the upper output port and the lower input port is connected to the lower output port. In these regions, the phase of the light passing through the lower input and output ports changes according to the intensity of the light signal input from the input port 1 as compared to the light passing through the upper input and output ports. Each of the optical modulation regions 35, 36, 37, and 38 is designed to include the amount of phase shift necessary for outputting a signal corresponding to each bit of the digital signal. Note that the details are described later.

Next, four pairs of lights output from the upper and lower output ports through the optical modulation regions 35, 36, 37, and 38 interfere in the optical coupler/splitter 11. Then, the output light is distributed to the pair of output ports (for example, the output ports 13 and 14). Note that although FIG. 6 illustrates that the optical splitter 10 has one input and two inputs, and the optical coupler/splitter 11 has two inputs and two outputs, it is not limited to this.

In a similar manner as the first exemplary embodiment, the pair of lights output from each path of the MZ interferometer 4 is O/E converted by the balanced receiver 9. The balanced receiver 9 here is composed of a pair of PDs that are connected in series. Assigning 0 and 1 of a digital signal according to an output from each balanced receiver 9 generates a digital output signal Dout.

Next, an operating principle is explained using FIGS. 7A to 7D. FIGS. 7A to 7D are diagrams respectively showing details of the optical modulation regions 35 to 38 in FIG. 6. Optical intensity-to-phase converters 39 are provided in the optical modulation regions 35 to 38. These regions have a function to convert an optical intensity change into delay. The number of these optical intensity-to-phase converters 39 differs for each of the optical modulation regions 35 to 38. Specifically, there is one in the optical modulation region 35, two in the optical modulation region 36, four in the optical modulation region 37, and eight in the optical modulation region 38. In general, to create an n-bit optical A/D converter, the number of the optical intensity-to-phase converters 39 may be $2^k$ (k=0, . . . , n−1) in order from more significant bits to less significant bits.

In addition to the local lights LL3 to LL0, analog signals A3 to A0, which are signal lights, are input to the optical intensity-to-phase converters 39 of the optical modulation regions 35 to 38. The phase of the local light is modulated according to the intensity of the signal light to be output.

Figure 7A:
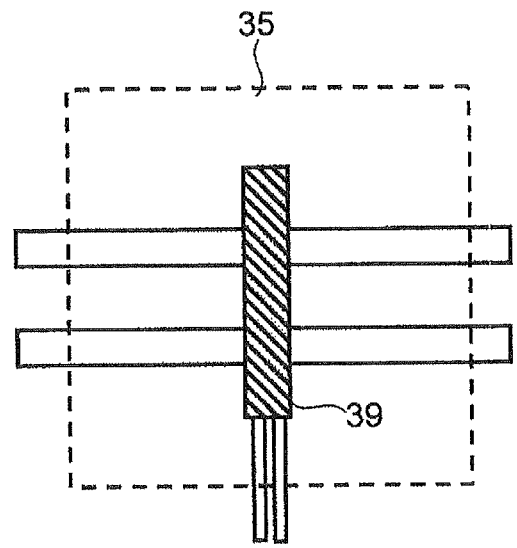
FIG. 7A is a diagram showing a configuration of an optical modulation region 35 in FIG. 6.
Figure 7B:
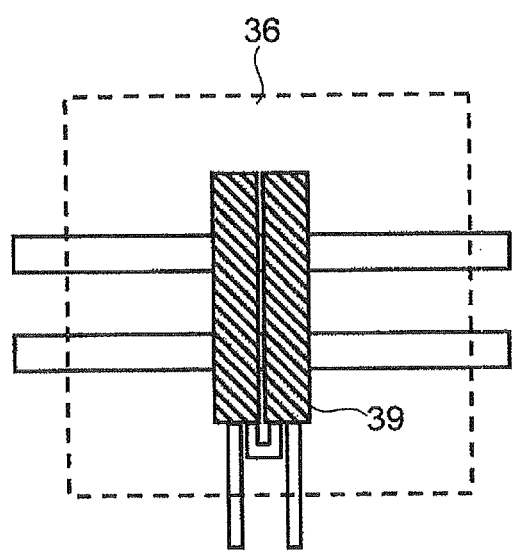
FIG. 7B is a diagram showing a configuration of an optical modulation region 36 in FIG. 6.
Figure 7C:
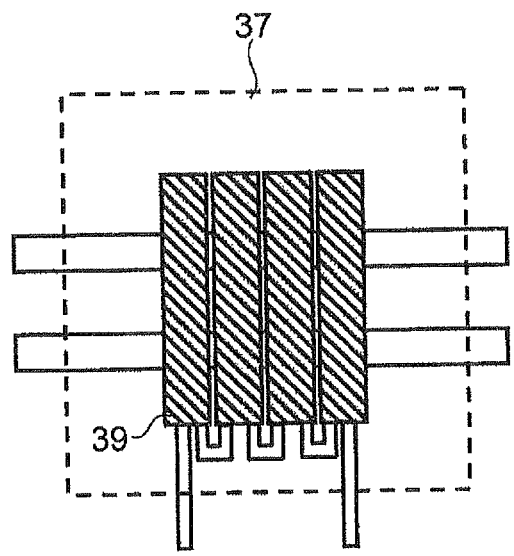
FIG. 7C is a diagram showing a configuration of an optical modulation region 37 in FIG. 6.
Figure 7D:
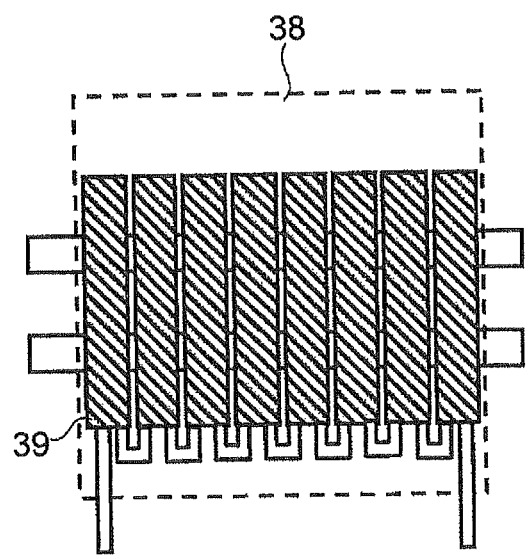
FIG. 7D is a diagram showing a configuration of an optical modulation region 38 in FIG. 6.
Figure 7E:
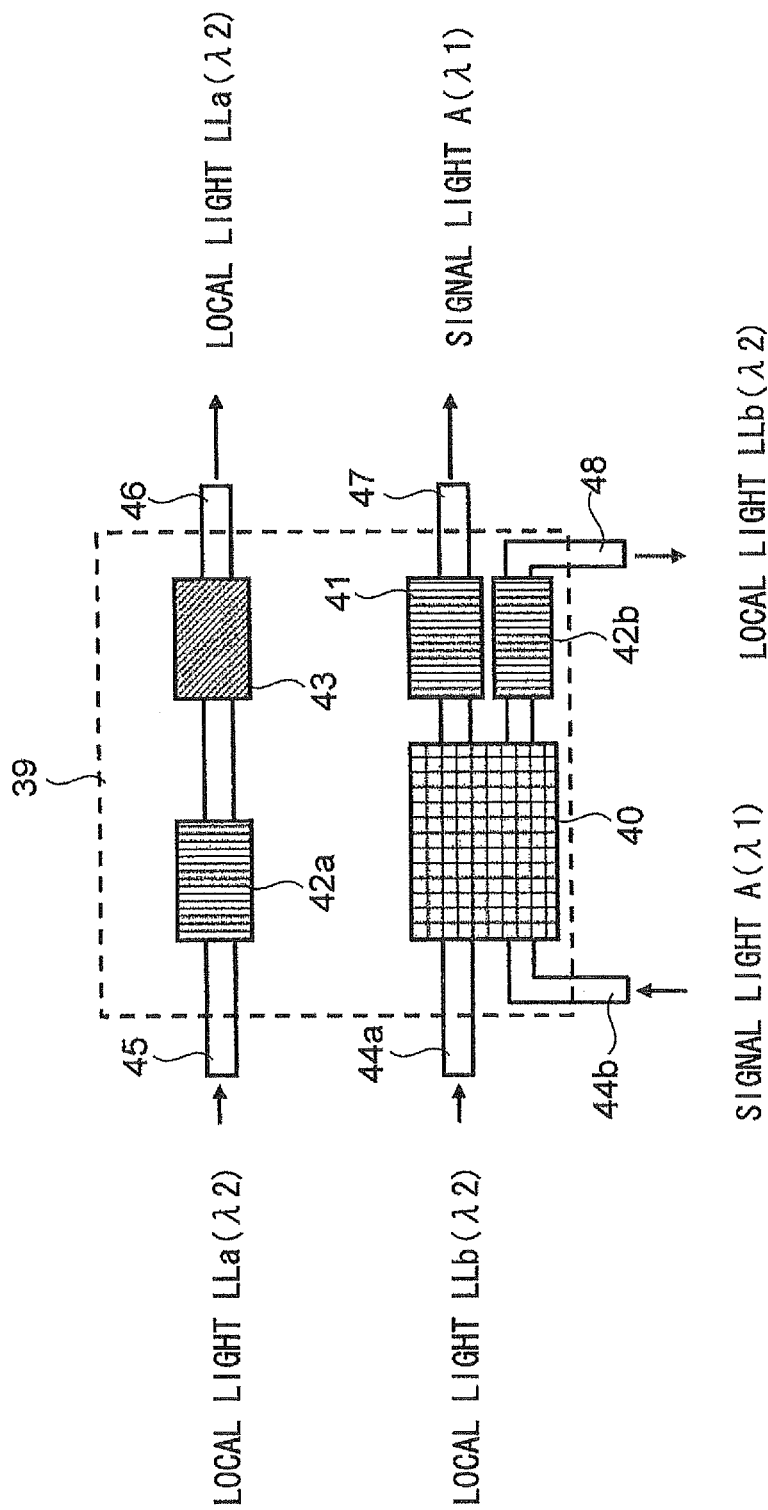
FIG. 7E is a diagram showing a configuration of an optical intensity-to-phase converter 39.

FIG. 7E is an example of the specific configuration of the optical intensity-to-phase converter 39. A local light LLb (wavelength λ2) input from an input waveguide 44a of the optical intensity-to-phase converter 39 undergoes a change in the phase according to the intensity of a signal light A (wavelength λ1) input from an input waveguide 44b in a region 40. Moreover, it is designed in a way that the local light LLb and the signal light A are output separately from the exit of the region 40. Then, the local light LLb is output from an output waveguide 48 through an optical intensity adjuster 42b. Further, the signal light A is output from an output waveguide 47 through an optical intensity adjuster 41. Additionally, the region 40 is configured so that the phase rotation will be $2\pi$ it according to the optical intensity from the minimum optical intensity to the maximum optical intensity.

Specifically, for example, the region 40 has 2×2 MMI (Multi Mode Interference) waveguides that are composed of semiconductor optical waveguides. The width and length thereof are designed so that the light input to the input waveguide 44a, which is the upper port of the MMI waveguide, is output to the lower output waveguide 48, and the light input to the input waveguide 44b, which is the lower port, is output to the upper output waveguide 47. Moreover, the semiconductor optical waveguide of this region 40 has a pin structure with electrodes disposed on top and bottom so that current or voltage can be applied thereon. The amount of phase rotation is set to be desirable according to the intensity change of the signal light by this current value and the like.

A local light LLa (wavelength λ2) input to the input waveguide 45 is output from an output waveguide 46 through an optical intensity adjuster 42a and an optical phase adjuster 43. The optical intensity adjusters 42a and 42b and the optical phase adjuster 43 are adjusted so that the relation between the intensity and the phase of the local light input to the input waveguide 45 and the input waveguide 44a is the same. For example, the optical intensity adjusters 42a and 42b are adjusted in advance so that the intensity of the output waveguide 46 and the output waveguide 48 will be the same when the signal optical intensity is the minimum optical intensity. Further, the optical phase adjuster 43 is adjusted in advance so that the phases of the output waveguide 46 and the output waveguide 48 will be the same when the signal optical intensity is the minimum optical intensity. Furthermore, when the optical intensity-to-phase converters 39 are successively connected in cascade as in the optical modulation regions 36, 37, and 38, the optical intensity adjuster 41 is adjusted in advance so that the relation between the signal light and the local light will be the same. In summary, the optical intensity adjuster 41 in the optical intensity-to-phase converter 39 is not necessary in the optical modulation region 35 shown in FIG. 7A. Note that it is preferable that the wavelength λ2 of the local lights LLa and LLb and the wavelength λ1 of the signal light A are different.

Specifically, the optical intensity adjusters 41, 42a, and 42b are configured to use SOA and be capable of adjusting a current value thereof as desirable. Moreover, the optical phase adjuster 43 is adjusted to cause desired phase rotation by applying an electric field on the semiconductor light waveguide having the pin structure. In general, the optical intensity adjustment using SOA requires a separate phase rotation adjustor as it involves phase rotation.

With such a configuration, a change in the optical intensity from the minimum optical intensity to the maximum optical intensity causes the phase rotation of 2π in the light modulation region 35, 4π in the light modulation region 36, 8π in the light modulation region 37, and 16π in the light modulation region 38.

Figure 7F:
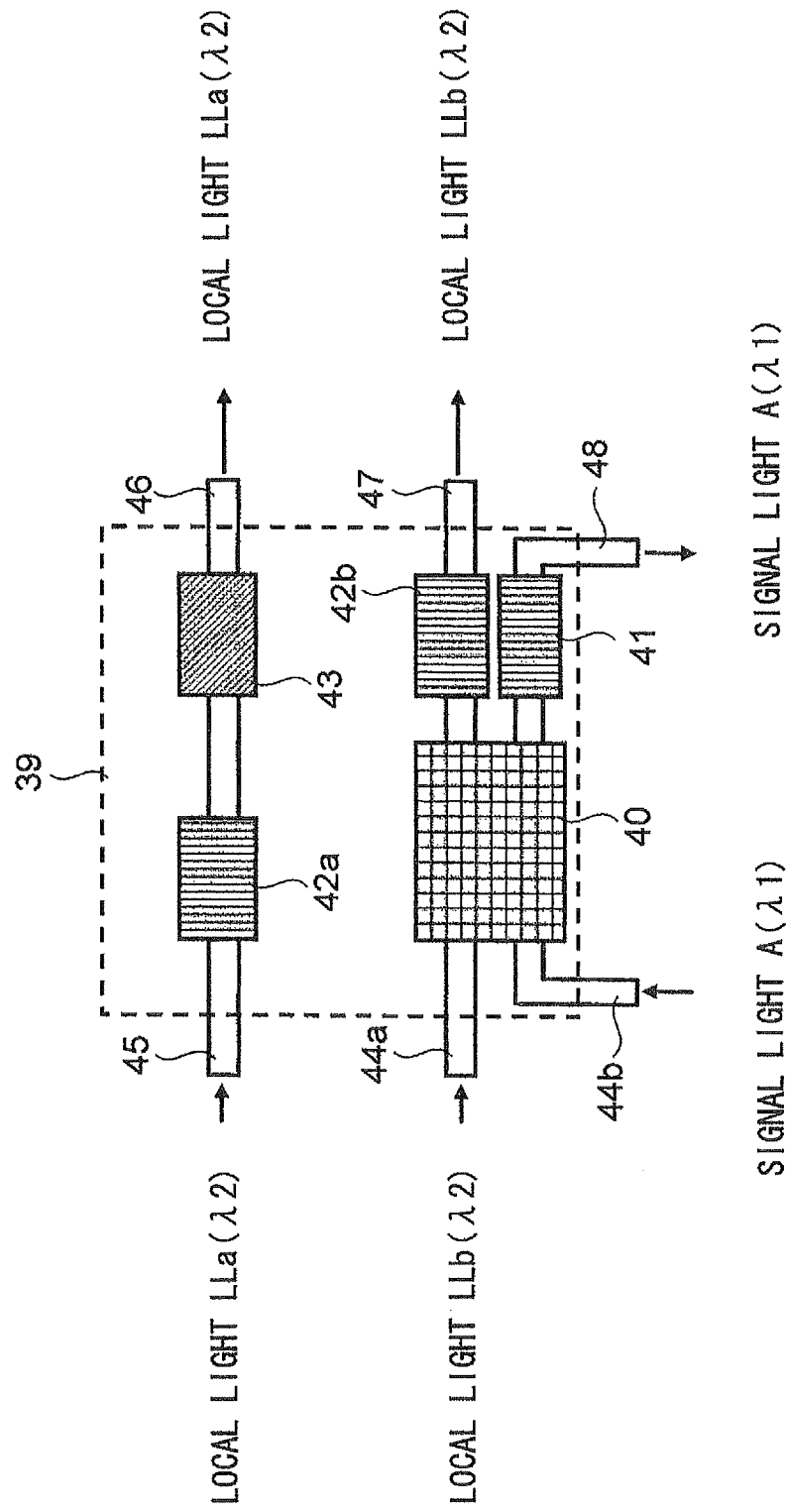
FIG. 7F is a diagram showing another configuration of the optical intensity-to-phase converter 39.

Note that in the optical intensity-to-phase converter 39 shown in FIG. 7E, the output positions of the local light and the signal light are reversed in an output part of the region 40. However, it is possible to change the length of the region 40 according to the extent of cross phase modulation of the signal light and the local light and not to reverse the output positions of the local light and the signal light. Such a configuration is shown in FIG. 7F.

Then, similar characteristics as the first exemplary embodiment can be obtained. Specifically, the light transmitting through the MZ interferometer 4 changes in a manner such that delay between the arms of the light modulation region 35 changes from 0 to 2π according to the optical intensity from the minimum optical intensity to the maximum optical intensity. Accordingly, the ratio of output optical intensity B1 from the output port 13 to a total (B1+B2) of the output optical intensity B1 from the output port 13 and the output optical intensity B2 from the output port 14 passed through the MZ interferometer 4, which is relative optical intensity B1/(B1+B2), changes as shown in FIG. 4. Therefore, FIG. 4 shows a ratio calculated based on the optical intensity of the part 21 shown in FIG. 1.

Then, the intensity of B1 and B2 is compared and an evaluation of 0 or 1 should be performed according to which one is greater. Specifically, as the balanced receiver 9 can detect the difference in the output by combining the two PDs, a digital value can be obtained using a comparator.

This ratio is set so that the phase rotation will be 2π according to the optical intensity from the minimum optical intensity to the maximum optical intensity in the light modulation region 35. Therefore, the repetition period $P_{period}=1/f$ (f is a repetition frequency) will be one period according to the optical intensity from the minimum optical intensity to the maximum optical intensity.

Similarly, the light modulation region 36, light modulation region 37, and light modulation region 38 are configured so that the phase rotation will be 4π, 8π, and 16π according to the optical intensity up to the maximum optical intensity. Accordingly, when the repetition frequency in the above optical modulation region 5 is f, the repetition frequency of the ratio of the output optical intensity from the output port 15 to the total output optical intensity from the output ports 15 and 16 will be 2×f. Similarly, the repetition frequency of the ratio of the output optical intensity from the output port 17 to the total output optical intensity from the output port 17 and the output port 18 will be 4×f. The repetition frequency of the ratio of the output optical intensity from the output port 19 to the total output optical intensity from the output port 19 and the output port 20 will be 8×f.

Each of outputs from the optical modulation regions 35 to 38 is input to the balanced receivers 9, and digital signals D3, D2, D1, and D0 corresponding to the analog signals A3, A2, A1 and A0 are output. Specifically, the digital signals D3, D2, D1, and D0 as shown in FIG. 5 are obtained according to the input optical intensity. In other words, the optical intensity of the analog input signal is converted into the digital signal.

Third Exemplary Embodiment

Figure 8:
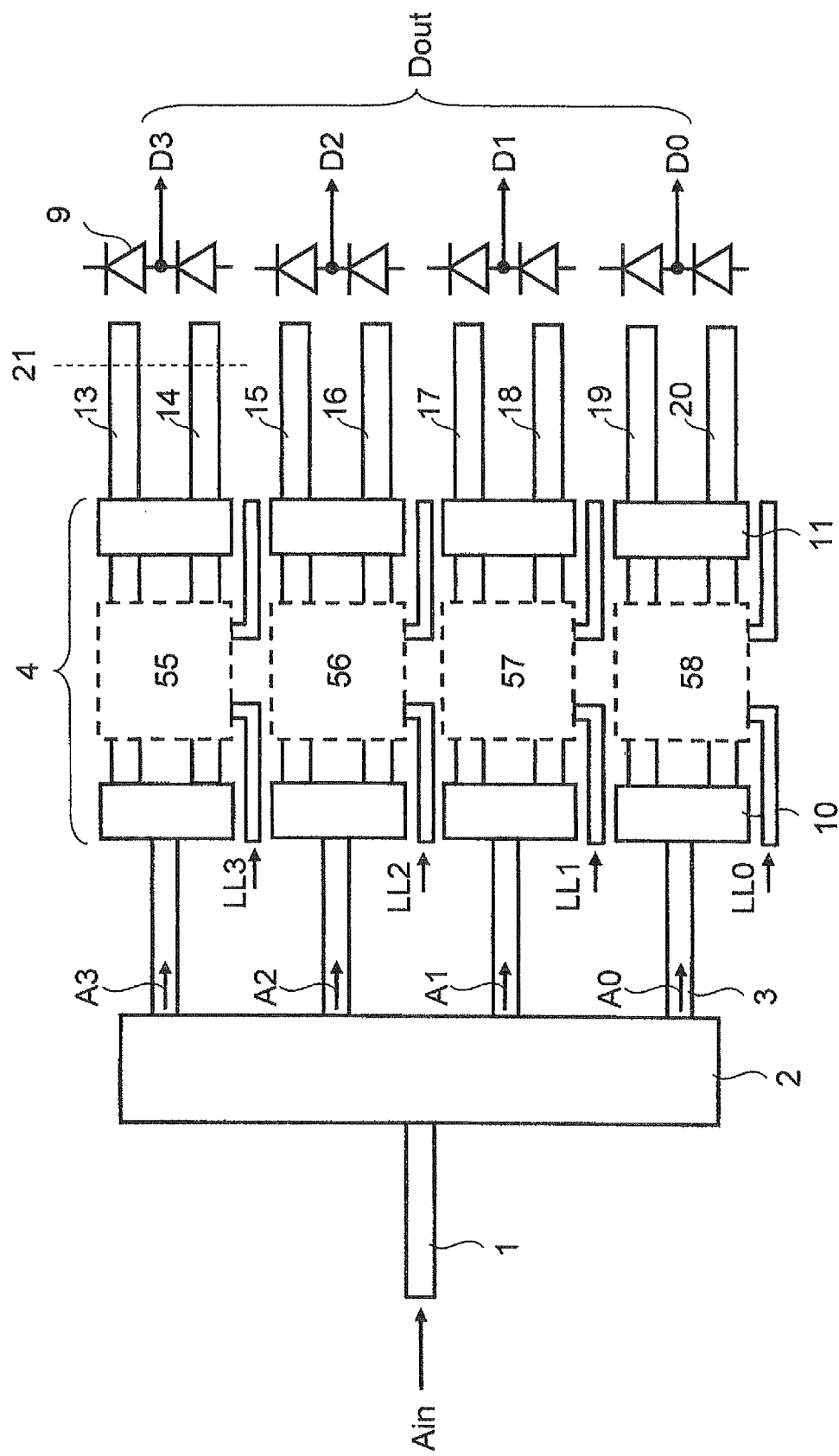
FIG. 8 is a block diagram of the optical A/D converter according to the third exemplary embodiment.

Next, a third exemplary embodiment is explained with reference to FIG. 8. FIG. 8 shows a configuration example of a four-bit optical A/D converter. The same components as those in FIG. 1 are denoted by the same reference numerals, and the explanation is omitted as appropriate. A local light is not introduced in the optical modulation regions 5, 6, 7, and 8 in FIG. 1 in the first exemplary embodiment. On the other hand, this exemplary embodiment is different in the point that a local light LL3, LL2, LL1, and LL0 is introduced in optical modulation regions 55, 56, 57, and 58. This enables improvement in the efficiency of changing the phase according to the light signal intensity.

The function of the optical modulation regions 55, 56, 57, and 58 is similar to that of the optical modulation regions 5, 6, 7, and 8 in FIG. 1, and the optical modulation regions 35, 36, 37, and 38 in FIG. 6. As shown in FIGS. 9A to 9D, the optical modulation regions 55, 56, 57, and 58 respectively include $2^0=1$, $2^1=2$, and $2^2=4$, and $2^3=8$ number of optical intensity-to-phase converters 59. Such a configuration is similar to the one in the second exemplary embodiment and the method of determining the number of inclusion is also similar.

Figure 9A:
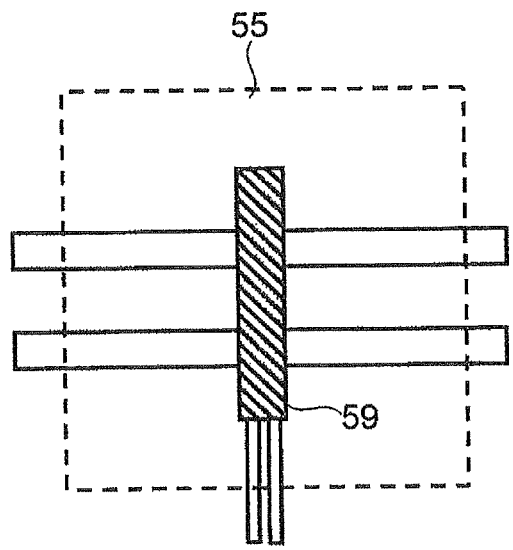
FIG. 9A is a diagram showing a configuration of an optical modulation region 55 in FIG. 8.
Figure 9B:
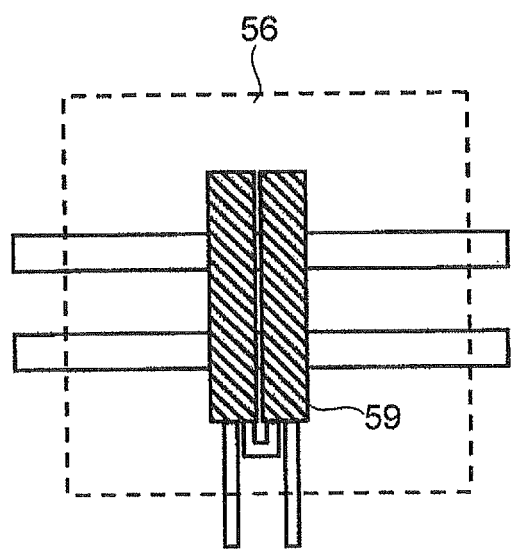
FIG. 9B is a diagram showing a configuration of an optical modulation region 56 in FIG. 8.
Figure 9C:
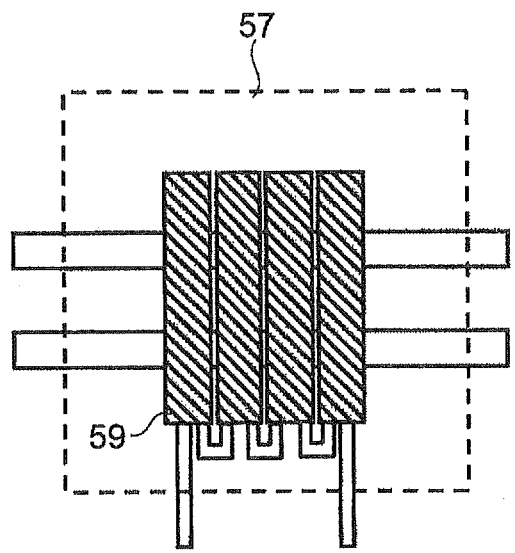
FIG. 9C is a diagram showing a configuration of an optical modulation region 57 in FIG. 8.
Figure 9D:
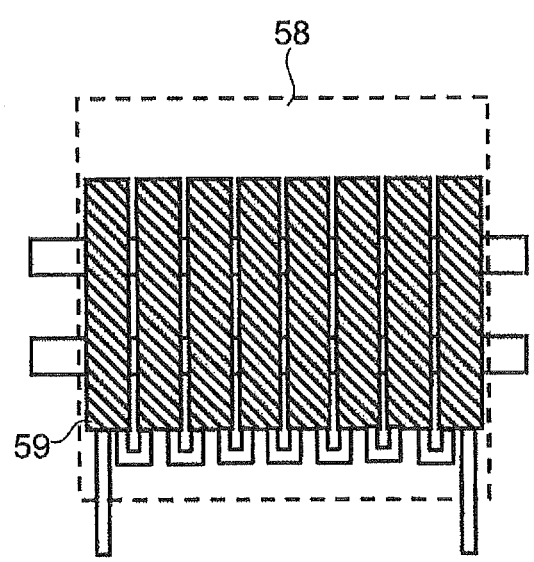
FIG. 9D is a diagram showing a configuration of an optical modulation region 58 in FIG. 8.
Figure 9E:
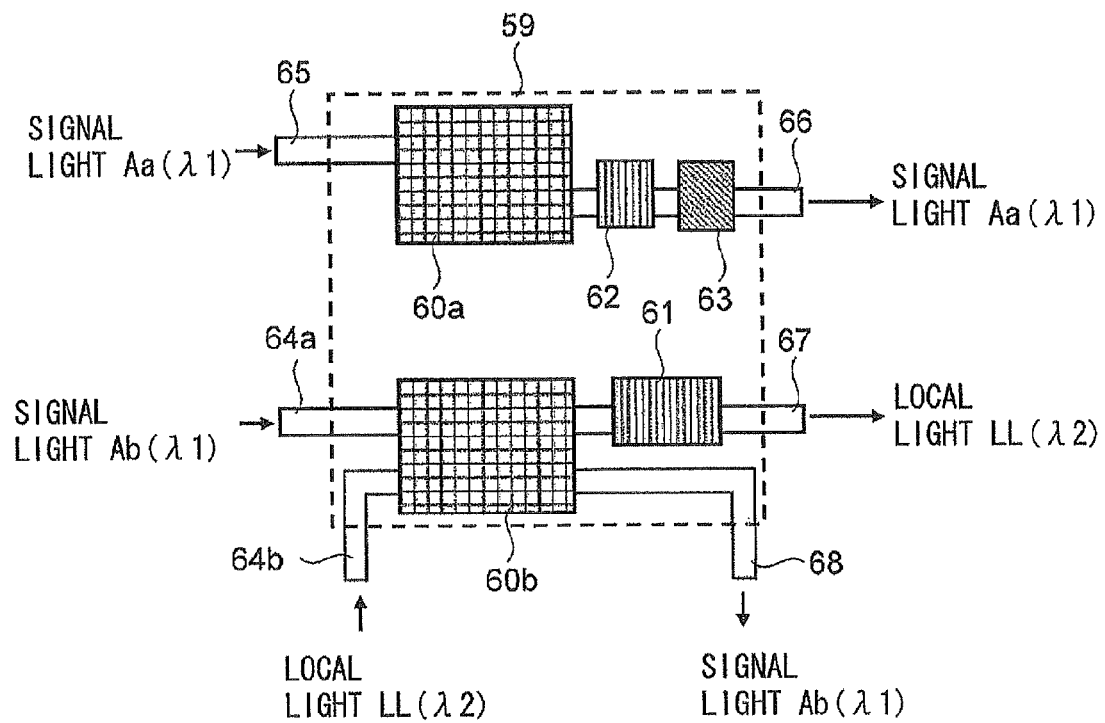
FIG. 9E is a diagram showing a configuration of an optical intensity-to-phase converter 59.
Figure 10A:
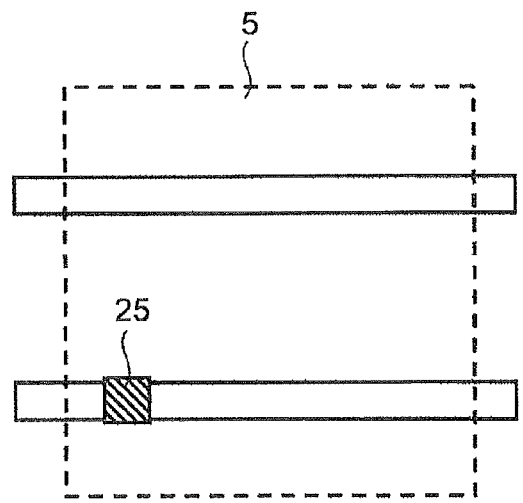
FIG. 10A is a diagram showing a configuration of the optical modulation region 5 in FIG. 1 corresponding to a digital code in FIG. 12.
Figure 10B:
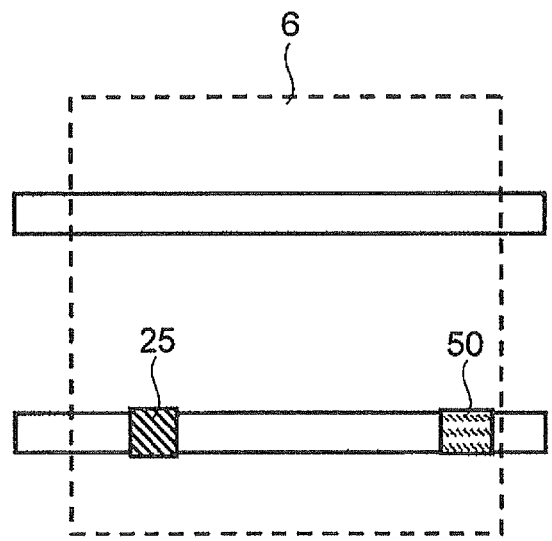
FIG. 10B is a diagram showing a configuration of the optical modulation region 6 in FIG. 1 corresponding to a digital code in FIG. 12.
Figure 10C:
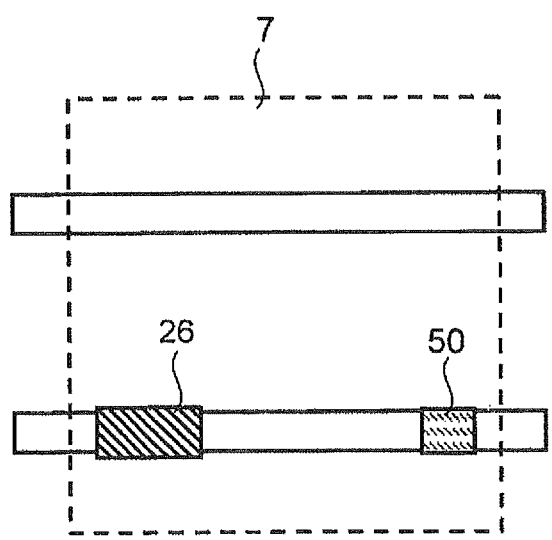
FIG. 10C is a diagram showing a configuration of the optical modulation region 7 in FIG. 1 corresponding to a digital code in FIG. 12.
Figure 10D:
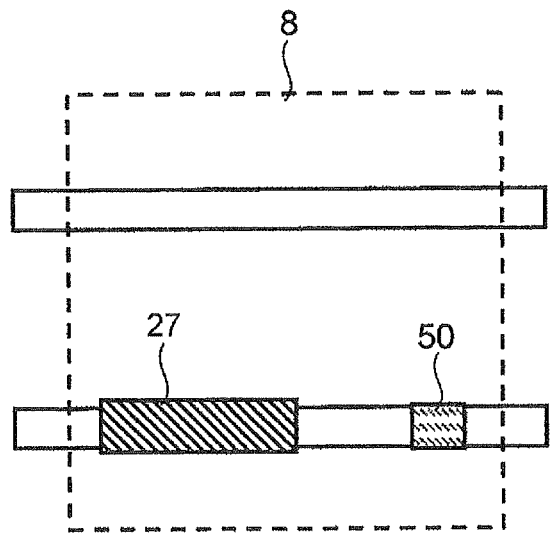
FIG. 10D is a diagram showing a configuration of the optical modulation region 8 in FIG. 1 corresponding to a digital code in FIG. 12.
Figure 11A:
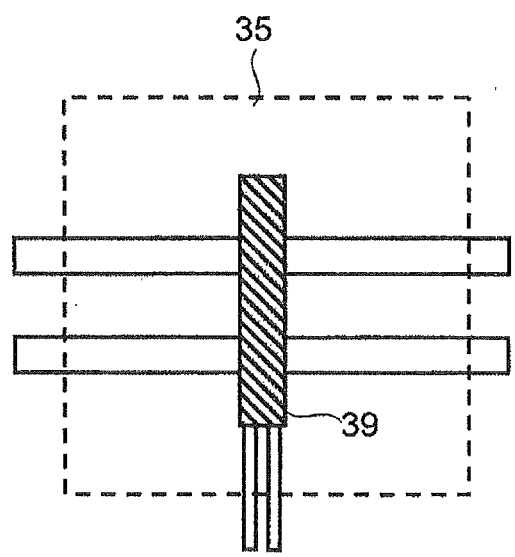
FIG. 11A is a diagram showing a configuration of the optical modulation region 35 in FIG. 6 corresponding to a digital code in FIG. 12.
Figure 11B:
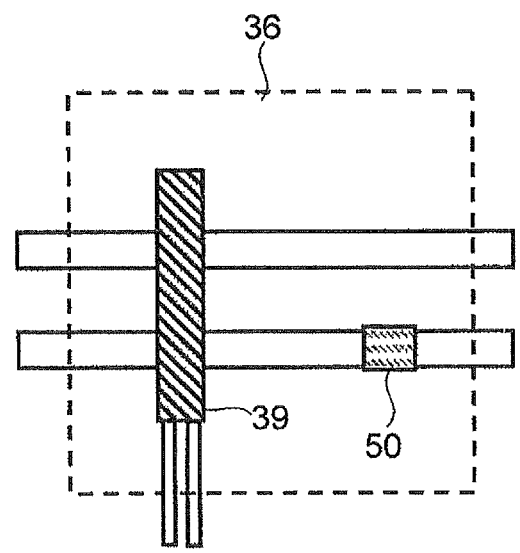
FIG. 11B is a diagram showing a configuration of the optical modulation region 36 in FIG. 6 corresponding to a digital code in FIG. 12.
Figure 11C:
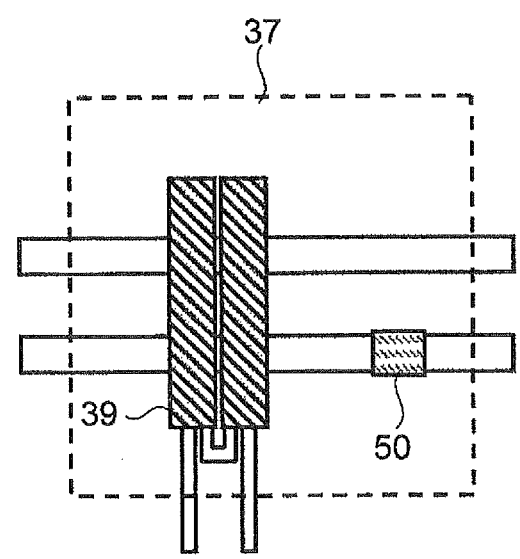
FIG. 11C is a diagram showing a configuration of the optical modulation region 37 in FIG. 6 corresponding to a digital code in FIG. 12.
Figure 11D:
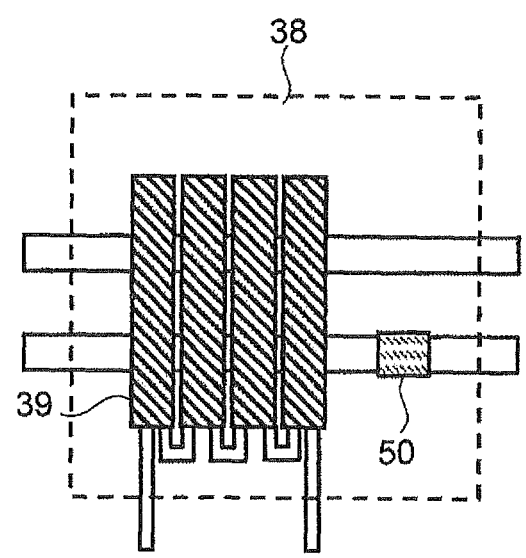
FIG. 11D is a diagram showing a configuration of the optical modulation region 38 in FIG. 6 corresponding to a digital code in FIG. 12.

FIG. 9E is an example of a specific configuration of the optical intensity-to-phase converter 59. Regions 60a and 60b here include, for example, 2×2 MMI waveguides that are composed of semiconductor optical waveguides. The width and length thereof are designed so that a light input to an upper port of the MMI waveguide is output to a lower part, and a light input to a lower port is output to an upper part. The regions 60a and 60b of the same MMI waveguide are respectively provided to both of a lower input waveguide 64a and an upper input waveguide 65 in the optical intensity-to-phase converter 59. A local light LL (wavelength λ2) is introduced only to the region 60b of the lower input waveguide 64a. This enables generation of states with different optical intensity inside the MMI waveguide under the same signal light change. Accordingly, delay can be given to a signal light Aa (wavelength λ1) and Ab (wavelength λ1) that is input to the upper and lower ports using the difference between the self phase modulation and cross phase modulation caused in the MMI waveguide.

Note that also in the optical intensity-to-phase converter 59 shown in FIG. 9E, it is possible not to reverse the output positions of the signal light and the local light in a similar manner as FIG. 7F.

The signal light Aa here input to the input waveguide 65 of the optical intensity-to-phase converter 59 is output from an output waveguide 66 through the region 60a, an optical intensity adjuster 62, and an optical phase adjuster 63. On the other hand, the signal light Ab input from the input waveguide 64a undergoes a change in the phase according to the intensity of the local light LL input from the input waveguide 64b in the region 60b. Moreover, it is designed in a way that the local light LL and the signal light Ab is output separately from an exit of the region 60b. Then, the signal light Ab is output from an output waveguide 68. Further, the local light LL is output from an output waveguide 67 through an optical intensity adjuster 61.

In a similar manner as the region 40 in the second exemplary embodiment, the semiconductor optical waveguides of these regions 60a and 60b have the pin structure with electrodes disposed on top and bottom so that current or voltage can be applied thereon. As described so far, disposing the optical intensity-to-phase converter 59 in the manner shown in FIGS. 9A to 9D obtains the digital signals as in FIG. 5.

Note that in the first to third exemplary embodiments, the length of the optical intensity-to-phase conversion units 25 to 28 and the number of the optical intensity-to-phase converters 39 and 59 are set based on the binary code. In practical, different values are set appropriately according to the format of the digital signal code.

Figure 12:
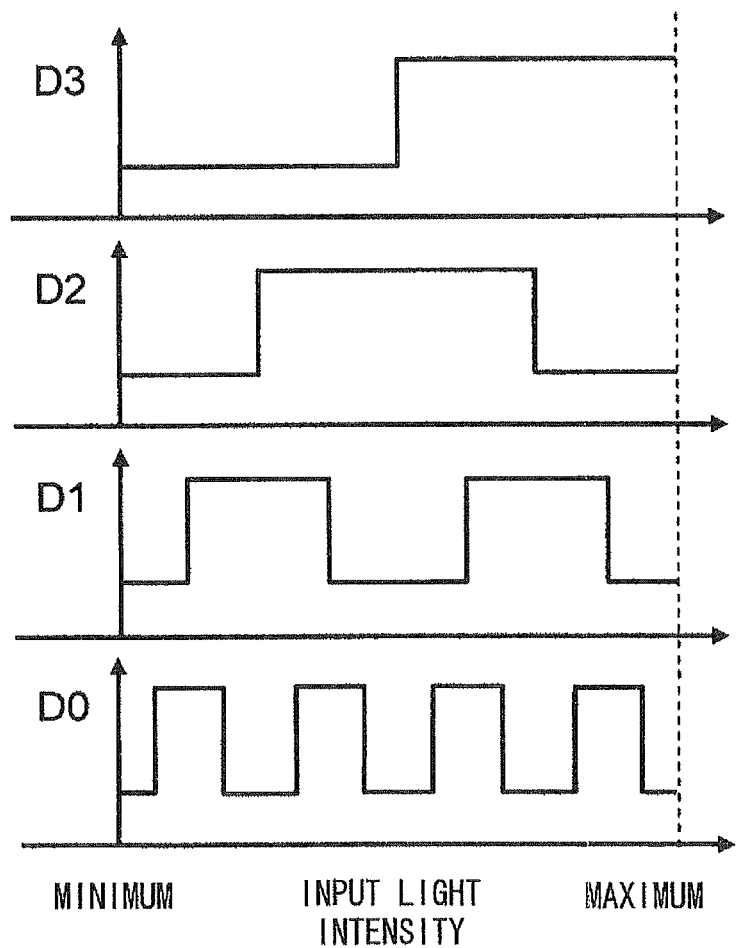
FIG. 12 is a diagram showing digital signals different from FIG. 5 that can be output in the first, second, and third exemplary embodiments.

For example, the optical modulation regions 5 to 8 in the first exemplary embodiment should have the configurations shown in FIGS. 10A to 10D in order to output Gray codes shown in FIG. 12. The optical phase modulator 50 rotates the phase by π/2 without changing the optical intensity. In this case, to create an n-bit optical A/D converter in general, assuming that the length of the optical intensity-to-phase conversion units of the most significant bit is L, the lengths of the optical intensity-to-phase conversion units to which signals of each bit are output should be 2^k(k=0, 0, 1, 2, 3, . . . , n−2) times of the length L from more significant bits to less significant bits. The length of the optical intensity-to-phase conversion unit can be shorter than in the case of binary code.

Specifically, the optical phase modulator 50 here should cause desired phase rotation by applying an electric field on the semiconductor optical waveguide having the pin structure. Further, it is possible to achieve to change the waveguide length by π/2 as the optical path length. Such a configuration obtains digital outputs as shown in FIG. 12 according to the input optical intensity.

In the second exemplary embodiment, the optical modulation regions 35 to 38 may be configured as in FIGS. 11A to 11D to enable output of the Gray codes shown in FIG. 12. The optical phase modulator 50 here rotates the phase by π/2 without changing the optical intensity. In general, to create an n-bit optical A/D converter, the number of the optical intensity-to-phase converters 39 may be 2^k(k=0, 0, 1, 2, 3, . . . , n−2) in order from more significant bits to less significant bits. The number of the optical intensity-to-phase converters 39 can be made less than the case of binary code. In a similar manner, in the third exemplary embodiment, the optical modulation regions 55 to 58 may be configured as in FIGS. 11A to 11D to enable output. This optical phase modulator 50 can also be realized by a similar method as the optical phase modulator 50 in the above FIGS. 10A to 10D.

Note that it is needless to say that the above exemplary embodiments can be combined within the range not contradicting the contents thereof. Although the abovementioned exemplary embodiments and modifications explained the configuration of each part in detail, the configuration can be modified in the range satisfying the present invention. According to the present invention, as the high speed and low power optical A/D converter can be realized, it is possible to use the optical A/D converter in the optical modulation circuit taking advantage of high speed and low power. Specifically, the optical A/D converter of the present invention can be included in a coherent detection circuit and an optical direct detection circuit.

Although the present invention has been explained with reference to the exemplary embodiments, the present invention is not limited by above. Various modifications that can be understood by a person skilled in the art can be made to the configurations and details of the present invention within the scope of the invention.

The present application claims priority rights of and is based on Japanese Patent Application No. 2010-115544 filed on May 19, 2010 in the Japanese Patent Office, the entire contents of which are hereby incorporated by reference.

INDUSTRIAL APPLICABILITY

The technique according to the present invention can be used for an optical analog-to-digital converter, an optical signal demodulator and an optical modulator-demodulator using thereof, the optical analog-to-digital converter and the like that are used in an optical communication system or optical interconnection.

REFERENCE SIGNS LIST

1 INPUT PORT
2 and 10 OPTICAL SPLITTER
3 OPTICAL WAVEGUIDE
4 MZ INTERFEROMETER
5 to 8, 35 to 38, 55 to 58 OPTICAL MODULATION REGION
9 BALANCED RECEIVER
11 OPTICAL COUPLER/SPLITTER
13 to 20 OUTPUT PORT
21 CROSS-SECTION
25 to 28 OPTICAL INTENSITY-TO-PHASE CONVERSION UNIT
39 and 59 OPTICAL INTENSITY-TO-PHASE CONVERTER
40, 60a, and 60b REGION
41, 42a, 42b, 61, and 62 OPTICAL INTENSITY ADJUSTOR
43 and 63 OPTICAL PHASE ADJUSTER
44a, 44b, 45, 64a, 64b, and 65 INPUT WAVEGUIDE
46 to 48 and 66 to 68 OUTPUT WAVEGUIDE
50 OPTICAL PHASE MODULATOR

The invention claimed is:

1. An optical A/D converter, comprising:
an optical splitter that splits an input analog optical signal into a plurality of optical signals;
a plurality of Mach-Zehnder interferometers, each of the plurality of optical signals split by the optical splitter being input to the plurality of Mach-Zehnder interferometers;
a plurality of optical/electrical conversion units that convert each optical signal output from each of the Mach-Zehnder interferometers into a digital electrical signal,
wherein each of the Mach-Zehnder interferometers comprises:
an internal optical splitter that splits an input light into two lights;
first and second waveguides connected to the internal optical splitter;
a third waveguide to which a light different from a light input to the first and second waveguides is input;
an optical modulation region connected to the first, second, and third waveguides; and
a coupler/splitter connected to the first and second waveguides,
wherein the optical modulation region comprises an optical intensity-to-phase conversion unit that shifts a phase of the light input to the second waveguide according to an intensity of the light input to the third waveguide,
wherein one of the optical signal and a local light having a wavelength different from that of the optical signal is input to the first and second waveguides, and another of the optical signal and the local light is input to the third waveguide,
wherein the optical modulation region outputs the optical signal and the local light separately, and
wherein an amount of a phase shifted by the optical intensity-to-phase conversion unit shift differs for said each of the Mach-Zehnder interferometers.

2. The optical A/D converter according to claim 1, wherein the optical intensity-to-phase conversion unit comprises a semiconductor optical amplifier.

3. The optical A/D converter according to claim 1, wherein the amount of the phase shifted differs based on a number of the optical intensity-to-phase conversion unit being different for said each of the Mach-Zehnder interferometers.

4. The optical A/D converter according to claim 1, wherein the optical/electrical conversion units include a balanced receiver including two photodiodes connected in series.

5. An optical signal demodulator comprising the optical A/D converter according to claim 1.

6. An optical modulator-demodulator comprising the optical signal demodulator according to claim 5.

7. The optical A/D converter according to claim 1, wherein the optical modulation region comprises identical optical modulation regions connected with one another in a cascade arrangement.

8. The optical A/D converter according to claim 1, wherein an output of the optical signal and the local light from the optical modulation region is input to a photoreceiver.

9. The optical A/D converter according to claim 1, wherein the optical/electrical conversion units include a balanced receiver including a plurality of photodiodes.

10. The optical A/D converter according to claim 9, wherein the photodiodes are connected in series.

11. A method of constructing an optical A/D converter, the method comprising:
providing an optical splitter that splits an input analog optical signal into a plurality of optical signals;
providing a plurality of Mach-Zehnder interferometers, each of the plurality of optical signals split by the optical splitter being input to the plurality of Mach-Zehnder interferometers;
providing a plurality of optical/electrical conversion units that convert each optical signal output from each of the Mach-Zehnder interferometers into a digital electrical signal;
providing an internal optical slitter in said each of the Mach-Zehnder interferometers, the internal optical splitter splitting an input light into two lights;
providing first and second waveguides in said each of the Mach-Zehnder interferometers, the first and second waveguides being connected to the internal optical splitter;
providing a third waveguide in said each of the Mach-Zehnder interferometers, the third waveguide being input with a light different from a light input to the first and second waveguides;
providing an optical modulation region in said each of the Mach-Zehnder interferometers, the optical modulation region being connected to the first, second, and third waveguides; and
providing a coupler/splitter in said each of the Mach-Zehnder interferometers, the coupler/splitter being connected to the first and second waveguides,
providing an optical intensity-to-phase conversion unit in the optical modulation region, the optical intensity-to-phase conversion unit being configured to shift a phase of the light input to the second waveguide according intensity of light input to the third waveguide,
performing a construction such that one of the optical signal and a local light having a wavelength different from that of the optical signal is input to the first and second waveguides, and another of the optical signal and the local light is input to the third waveguide,
performing a construction such that the optical modulation region outputs the optical signal and the local light separately; and
performing a construction such that an amount of a phase shifted by the optical intensity-to-phase conversion unit differs for said each of the Mach-Zehnder interferometers.

12. The method according to claim 11, wherein the optical modulation region comprises identical optical modulation regions connected with one another in a cascade arrangement.

13. The method according to claim 11, wherein the optical/electrical conversion units include a balanced receiver including a plurality of photodiodes.

14. The method according to claim 13, wherein the photodiodes are connected in series.

15. An optical A/D converter, comprising:
an optical splitter that splits an input analog optical signal into a plurality of optical signals;
a plurality of Mach-Zehnder interferometers, each of the plurality of optical signals split by the optical splitter being input to the plurality of Mach-Zehnder interferometers;
a plurality of optical/electrical conversion means that convert each optical signal output from said each of the Mach-Zehnder interferometers into a digital electrical signal,
wherein said each of the Mach-Zehnder interferometers comprises:
an internal optical splitter that splits an input light into two lights;

first and second waveguides connected to the internal optical splitter;
a third waveguide input with a light different from a light input to the first and second waveguides;
an optical modulation region connected to the first, second, and third waveguides; and
a coupler/splitter connected to the first and second waveguides,
wherein the optical modulation region comprises optical intensity-to-phase conversion means for shifting a phase of the light input to the second waveguide according to an intensity of the light input to the third waveguide,
wherein one of the optical signal and a local light having a wavelength different from that of the optical signal is input to the first and second waveguides, and another of the optical signal and the local light is input to the third waveguide,
wherein the optical modulation region outputs the optical signal and the local light separately, and
wherein an amount of a phase shifted by the optical intensity-to-phase conversion means differs for said each of the Mach-Zehnder interferometers.

16. The optical A/D converter according to claim 15, wherein the optical/electrical conversion means includes a balanced receiver including a plurality of photodiodes.

17. The optical A/D converter according to claim 16, wherein the photodiodes are connected in series.

* * * * *